May 7, 1963 W. J. ALBERSHEIM 3,089,136

TWIN TARGET RESOLVER

Filed Oct. 18, 1960 2 Sheets-Sheet 1

Walter J. Albersheim
*INVENTOR.*

*BY* S. J. Rotondi
A. P. Dupont
C. A. Phillips
ATTORNEYS.

May 7, 1963 W. J. ALBERSHEIM 3,089,136

TWIN TARGET RESOLVER

Filed Oct. 18, 1960 2 Sheets-Sheet 2

Walter J. Albersheim,
*INVENTOR.*

*BY* S. J. Rotondi
A. P. Dupont
C. A. Phillips
ATTORNEYS.

United States Patent Office 3,089,136
Patented May 7, 1963

1

3,089,136
TWIN TARGET RESOLVER
Walter J. Albersheim, Waban, Mass., assignor, by mesne assignments, to the United States of America as represented by the Secretary of the Army
Filed Oct. 18, 1960, Ser. No. 63,454
5 Claims. (Cl. 343—16)

This invention relates to radar systems and particularly to a monopulse radar system adapted to distinguish between closely positioned moving targets which are identical or substantially identical.

For two ideal point targets of constant amplitude ratio but variable phase difference, there exists known relations between the fluctuations of received amplitude and apparent angular location. By observing one or more fluctuation cycles, the direction angles and relative strength of two slowly moving point targets can be computed. Further, for a single low-flying point target, the number of beats between the target and its ground reflection is a known function of target distance, approach velocity and target altitude. Hence the altitude of a point target can be computed from distance, approach rate and fluctuation rate. However, both of these computations fail if the individual targets themselves fluctuate or "glint" as is always the case with airplanes or other extended area targets.

It is the object of the present invention to provide a radar tracking system which is capable of resolving twin targets separated by less than the radar beam width but more than the diameter of each single target and which is thus capable of tracking one of them.

The present invention utilizes the individual fluctuations of two targets as a means of determining a parameter, of either one of them. While the azimuth parameter is illustrated herein, the application to the two or three dimensional case is obvious.

Single fluctuations from two or more individual targets may be regarded as random functions that are either uncorrelated or, at least incompletely correlated. Consider two targets, $t_1$ and $t_2$, illuminated with intensities $I_1$ and $I_2$. Let their echoes be received by two feedhorns of a monopulse tracking radar. Let the gain in the direction from target $m$ to feedhorn $n$ be $g_{mn}$. Feedhorn 1 receives a signal:

$$s_1 = I_1 t_1 g_{11} + I_2 t_2 g_{21} \quad (1)$$

and feedhorn 2, $$s_2 = I_1 t_1 g_{12} + I_2 t_2 g_{22} \quad (2)$$

The sum signal, $$S = s_1 + s_2 \quad (3)$$

and the difference signal, $$D = s_1 - s_2 \quad (4)$$

fluctuate in an incompletely correlated manner, as long as both targets are iluminated. Hence, their quotient $$\frac{S}{D} = \frac{s_1 + s_2}{s_1 - s_2} = \frac{I_1 t_1 (g_{11} + g_{12}) + I_2 t_2 (g_{21} + g_{22})}{I_1 t_1 (g_{11} - g_{12}) + I_2 t_2 (g_{21} - g_{22})} \quad (5)$$

will also fluctuate.

However, if one of the target illuminations, say $I_1$, goes to zero, then the quotient degenerates to $$\underset{(I_1=0)}{\frac{S}{D}} = \frac{g_{21} + g_{22}}{g_{21} - g_{22}} = \text{constant} \quad (6)$$

for stationary targets.

Any function of $S/D$, such as:

$$\text{Log } S/D = \log S - \log D \quad (7)$$

will also become quasi-constant when one of the targets is just not illuminated.

2

If the target directions and hence the gain factors $g_{mn}$ drift slowly, then $S/D$ will also vary slowly, and at a much lower rate than that corresponding to the glint frequencies of an aircraft target in an X-band radar.

In furtherance of the preceding analysis a twin target resolving monopulse tracking radar is constructed providing means for:

(1) Producing zero illumination of the target at which the radar points;

(2) Generating a function of the quotient $S/D$ of the sum and difference monopulse signals;

(3) Sensing and tracking the direction in which the fluctations are at a minimum; and (4) Producing an error voltage roughly proportional in magnitude and polarity to the angular deviation from one of the twin targets.

The above mentioned and other objects and features of the invention will become more apparent by reference to the following description and drawings in which.

Figures 1, 2:
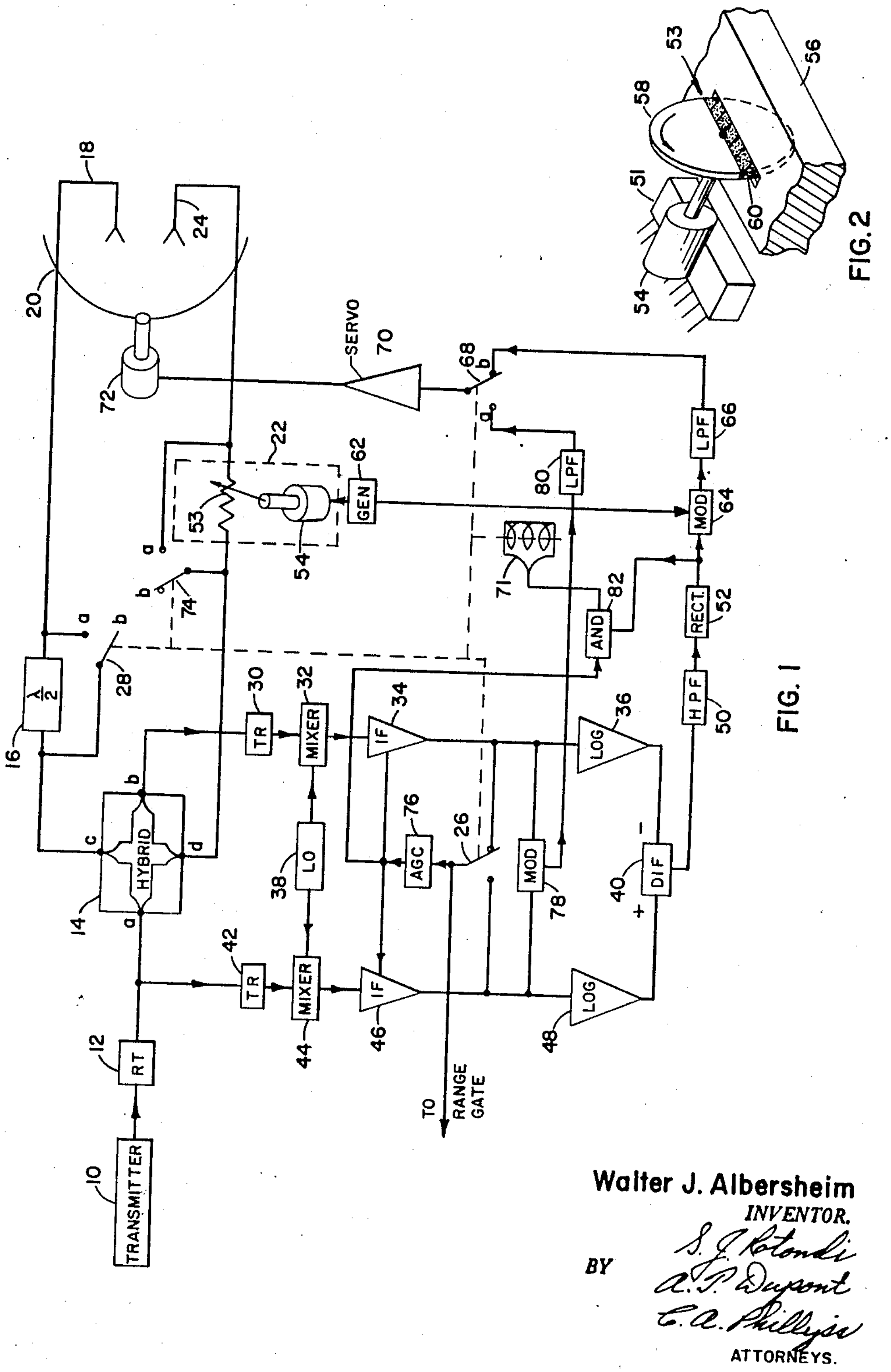
FIGURE 1 is a schematic block diagram of a twin target resolving radar embodying the invention.
FIGURE 2 is a perspective view, partly in section, of a rotary microwave attenuator employed as an element of the radar shown in FIGURE 1.

Referring now to the drawings, FIGURE 1 illustrates an embodiment of the invention which provides for both normal and twin target monopulse tracking. All switches in FIGURE 1 are positioned for twin target tracking, their alternate position adapting the circuit for normal tracking. Considering FIGURE 1 in detail, transmitter 10 is connected through receive-transmit (R.T.) switch 12 to line *a* of magic tee hybrid junction 14. In accordance with the well known properties of hybrid 14, power fed line *a* passes into lines *c* and *d* in equal quantities and in equal phase and no energy passes into line *b*. Line *c* of hybrid 14 feeds, thru phase inverter 16, feedhorn 18 of antenna 20. Line *d* of hybrid 14 feeds, thru rotary microwave attenuator 22, feedhorn 24 of antenna 20. By virtue of phase inverter 16, the polarity of one feedhorn is reversed with respect to the other. Hence, target illumination has the pattern normally associated with the received monopulse difference signal. That is, it is zero for the target toward which the antenna points.

Considering now signal reception, the effect of phase reverser 16 is to reverse the position of the sum and difference receiver channels from that which would exist in the conventional monopulse circuit. Since it is desirable to derive an automatic gain control (A.G.C.) signal from the sum signal, switch 26 allows the A.G.C. signal to be derived from either channel. With switch 28, which bridges phase reverser 16, in the open position and thus with phase reverser 16 in circuit, the right hand channel is the sum channel and the left hand channel the difference channel. Thus the sum channel, fed by line *b* of hybrid 14, consists of transmit-receive (T.R.) switch 30, followed by mixer 32, intermediate frequency (I.F.) amplifier 34, and logarithmic amplifier 36. An output of local oscillator (L.O.) 38 is heterodyned in mixer 32 with the received sum signal to provide the intermediate frequency input to I.F. amplifier 34. The output $\underline{S}$ of I.F. amplifier 34 feeds logarithmic amplifier 36 and the output log $\underline{S}$ of amplifier 36 is fed as the negative input to difference circuit 40.

The difference channel is fed by line *a* of hybrid 14 and consists of T.R. switch 42, followed by mixer 44, I.F. amplifier 46, and logarithmic amplifier 48. An output of local oscillator 38 is heterodyned with the received difference signal in mixer 44 to obtain the difference I.F. signal $\underline{D}$ which is amplified in I.F. amplifier 46 and fed to logarithmic amplifier 48. Amplifiers 36 and 48 must be adjusted to have equal logarithmic gain. Then the output, log $\underline{D}$, of logarithmic amplifier 48 is fed to the plus terminal of difference circuit 40. The output of difference circuit 40 is thus a function of $$\log \frac{D}{S}$$

a desired control signal, as indicated above.

In order to remove the effects of slow target drift from glint fluctuations, the signal $$\log \frac{D}{S}$$

is fed thru high pass filter (H.P.F.) 50.

The signal is then rectified in unfiltered rectifier 52 to provide an output which is zero when the radar points at one of the twin targets, but has constant polarity, when the radar deviates in either direction from the target. Sense or directionality signal information is obtained thru wobbling. This is accomplished by varying the gain of feedhorn 24 by rotary attenuator 22 at a rapid rate (say 30 c.p.s.). Rotary attenuator 22, shown in greater detail in FIGURE 2, consists of a variable attenuator wheel 53 driven by synchronous motor 54 which is supported by mount 51. A segment of attenuator wheel 53 extends thru a slit into waveguide 56, which connects feedhorn 24 to line *d* of hybrid 14. Attenuator wheel 53 consists of two semicircular regions of different resistivity, one a dielectric disc 58 and the other a carbon coated disc 60. Due to the variation in inserted loss as the attenuator rotates, the effective gain of feedhorn 24 is varied. Synchronous motor 54 is driven by A.C. generator (or oscillator) 62 which also supplies a voltage to modulator 64.

If antenna 20 does not point at one of multiple targets there will be an output from rectifier 52 modulated by the attenuator frequency (30 c.p.s.), a larger average output corresponding to a larger deviation from the target. The rectifier output is multiplied in modulator 64 by the output of generator 62 and the product contains a D.C. component approximately proportional in magnitude and polarity to the angular deviation from the target. This D.C. component is then passed thru low pass filter 66 to obtain a suitable error voltage for controlling the position of antenna 20. This error voltage is fed thru switch 68 to servo amplifier 70 and the output of servo amplifier 70 drives antenna servo motor 72 to track the target.

Which of two twin targets is tracked depends on the direction of radar approach. For instance, a low-flying plane should be acquired from above so that the tracker follows the plane and not its ground (or sea) reflection.

The system thus for described is capable of tracking one of two adjacent targets; but is unsuited to the tracking of a single target because the difference of the logarithm of sum and difference signals does not fluctuate appreciably for a single target, and thus produces no error voltage. Furthermore, illumination of a distant target by the difference of the lobes is inefficient; hence the signal-to-noise ratio would be poor and the range gate would not lock on.

Accordingly, as a feature of the invention, means are provided to track a distant target by normal monopulse and to switch to twin target tracking only after the targets have come close and their multiplicity is recognized. Changeover is automatic and based on the following sensed conditions:

(1) The signal is sufficiently strong so that target illumination by the difference signal can be tolerated; and (2) The quotient of sum and difference signals fluctuates, indicating twin or multiple targets.

In the "normal" position all switches, which are ganged and controlled by relay 71, would be in the *a* position (opposite of that shown) in which case: phase reverser 16 is shorted by switch 28; rotary attenuator 22 is shorted by switch 74; automatic gain control 76, controlling the gain of I.F. amplifier 34 and 46 is fed by switch 26 from the output of amplifier 46; and the normal error signal, obtained by multiplying the outputs of amplifiers 34 and 46 in modulator 78 and filtering the product in low-pass filter 80, is fed thru switch 68 to antenna control servo amplifier 70. These switches are controlled by relay 71 which is "normally" unenergized. Relay 71 is powered by "and" circuit 82 which produces an output only when "and" circuit inputs rise to predetermined threshold values. One of these inputs is obtained from A.G.C. circuit 76 and thus indicates the requisite signal strength for twin tracking, and the other input is obtained from the output of rectifier 52, which indicates the other requirement for twin tracking, that of the fluctuation of the quotient of sum and difference signals. With both of these signals adequately present, relay 71 is energized and all switches are pulled to the *b* (twin tracking) position. Relay 71 includes a holding coil or winding (not shown) to avoid relay chatter. The time constant of A.G.C. circuit 76 must be sufficiently long as not to suppress glint fluctuation.

Regarding range, during "twin tracking" during which the antenna points at one target, the output of the sum amplifier and hence the input to the range gate stems mainly from the other target. This cross-combination of angle and range data is not objectional because, if the targets could be resolved in range, no further resolving means would be needed.

A twin range gate is analogous to the two feedhorns of a monopulse radar (offset but with angular overlap). The range fluctuations of multiple targets obey the same statistics as the angular fluctuations. Hence, if two targets are slightly separated both in angle and in range, the quotient fluctuation method can be applied to range as well as to angle. That is, two range gate outputs can be connected to logarithmic amplifiers, the outputs of these amplifiers substracted, the difference passed thru a high pass filter, rectified and modulated by generator 62 which drives attenuator motor 54 The resulting error voltage is proportional to the range deviation from one of the targets.

Figure 3:
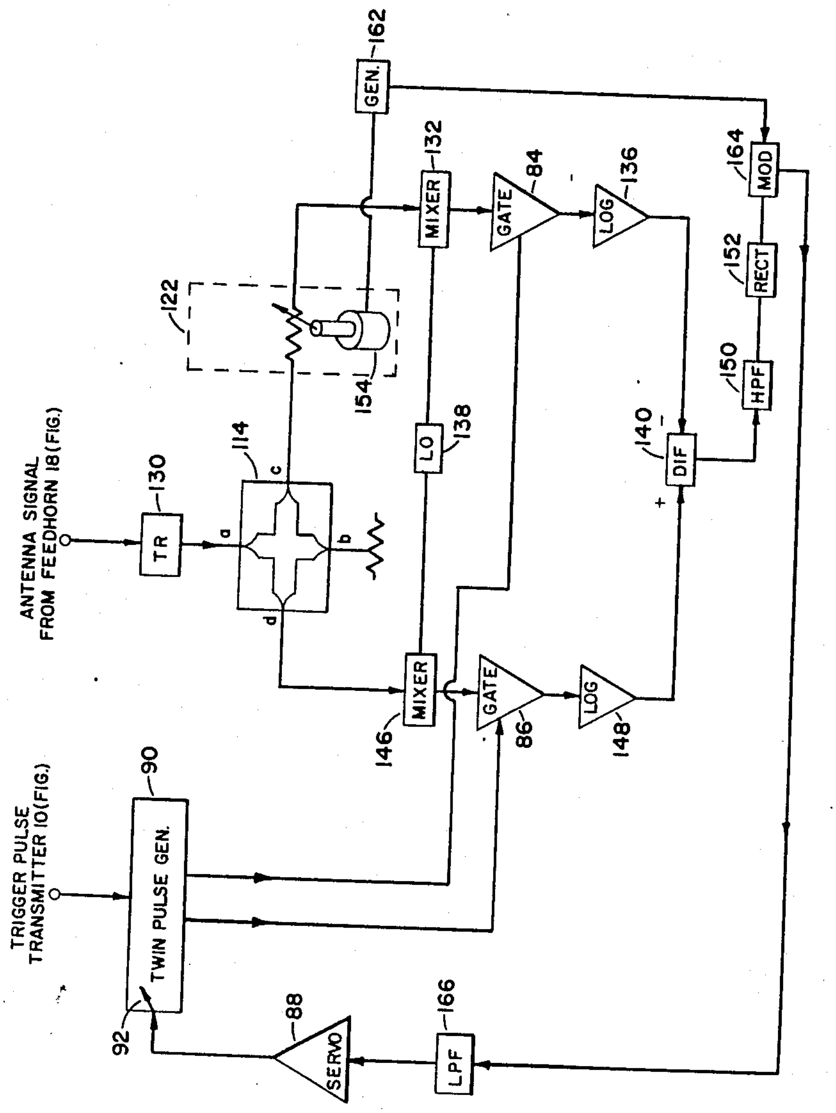
FIGURE 3 shows a twin range gate.

FIGURE 3 shows a partial block schematic of a range tracking circuit utilizing the principles set forth above. An input signal is obtained from feedhorn 18 of antenna 20. The echoes received pass thru T.R. box 130 to the *a* input of hybrid T divider 114 with outputs *c* and *d*. Line *b* of hybrid 114 is terminated in a load 115. Output *c* passes thru rotary attenuator 122 driven by motor 154. It then passes thru mixer 132 into gated amplifier 84 and into logarithmic amplifier 136. Output *d* goes to mixer 146 thru gated amplifier 86, and then into logarithmic amplifier 148. Amplifiers 136 and 148 have equal logarithmic gains. The difference of their outputs is obtained in differential circuit 140 and passes thru high pass filter 150 and rectifier 152. The rectifier output is modulated in modulator 164 by the same generator 162 that drives rotary attenuator motor 154. The output of modulator 164 passes thru low pass filter 166 into a servo amplifier 88 that drives variable delay twin gate pulse generator 90.

Part of the transmitter pulse (or a rectified envelope thereof) passes into pulse generator 90 and triggers it off. After a delay determined by a delay control 92 that is activated by servo amplifier 88, two gating pulses are generated. Their fixed time difference is made slightly less than the duration of the individual pulses so that they overlap in time in a manner analogous to the angular overlap of the two antenna feedhorns 18 and 24 in FIGURE 1.

The delay setting of control 92 determines the tracked echo delay and hence the target range in the same manner as the setting of antenna steering motor 72 determines target angle in FIGURE 1.

Appropriate switches and relays for switching from normal monopulse range lobing to twin target range resolution lobing will be evident to those skilled in the art. Their function is analogous to that of switches 28, 74, 26 and relay 71 in FIGURE 1.

The foregoing description of a system of twin target tracking is not to be construed as a sole definition of the invention. Particularly it is to be appreciated that the system in general may be applied to the resolution of twin targets in azimuth, elevation and in range. The spirit and scope of the invention shall therefore be limited only by the appended claims.

What is claimed is:

1. In a monopulse tracking radar comprising an antenna including first and second feedhorns for angular tracking about an axis, first and second signal transmission means, signal processing means having first, second, third and fourth terminals and including summing means for providing at said first terminal a signal proportional to the sum of signals applied to said third and fourth terminals and including difference means for providing at said second terminal a signal proportional to the difference of signals applied to said third and fourth terminals, said first transmission means connecting said first feedhorn to said third terminal, said second transmission means connecting said second feedhorn to said fourth terminal, and electrical means coupled to said antenna for training said antenna about said axis; the modification comprising adjacent target resolving means comprising means coupled to said first transmission means for shifting the phase of the signal being transmitted by $$\frac{\lambda}{2}$$

compared with the phase of the signal being transmitted by said second transmission means, modulation means coupled to one of said transmission means for periodically varying the amplitude of the signal being transmitted by said one of said transmission means, logarithmic amplifier means responsive to the output of said first and second terminals for obtaining a direct current signal proportional to the ratio of said first and second terminal outputs, multiplier means responsive to said direct current signal and an alternating current signal from said modulation means corresponding to the rate of periodic variation of said amplitude for multiplying said direct current and alternating current signals to obtain an antenna error signal, means responsive to said error signal for controlling said electrical means to train said antenna.

2. The radar set forth in claim 1 wherein said logarithmic amplifier means comprises a first logarithmic amplifier responsive to the output of said first terminal, a second logarithmic amplifier responsive to the output of said second terminal, difference means responsive to the output of said first and second logarithmic amplifier for subtracting the output of said second logarithmic amplifier from the output of said first logarithmic amplifier.

3 The radar set forth in claim 2 further comprising a high pass filter means responsive to the output of said difference means for blocking the passage of signals substantially lower than frequencies corresponding to radar glint fluctuations produced by moving aircraft targets, and rectifier means responsive to the filter output of said high pass filter means for rectifying said filter output.

4. The radar set forth in claim 3 wherein said transmission means comprise waveguides, said modulation means comprises a variable attenuation rotary microwave attenuator having first and second semicircular sectors of different resistivity and being partially extended into the cavity of said one of said transmission means, a synchronous motor being mechanically coupled to said rotary attenuator wherein variable attenuation is produced in said waveguide corresponding to the rate of rotation of said motor, an alternating current generating means connected to said motor for driving said motor and connected to said multiplier means for supplying said alternating current signal.

5. The radar set forth in claim 3 further comprising range tracking means comprising second said signal processing means, means for coupling received signals from said first transmission means to said first terminal of said second signal processing means, first and second signal gating means, second said modulation means responsive to said third terminal of said second signal processing means for providing an input signal to said second gating means with a periodically varying amplitude, said fourth terminal of said second signal processing means being connected to the signal input of said first gating means, variable delay twin range gate pulse generator means providing range gating pulses to said first and second gating means, said gating pulses having a time difference slightly less than the duration of individual pulses, said variable delay twin range gate pulse generator including variable delay means responsive to a transmitter pulse for providing said gating pulses, second ratio means responsive to the signal outputs of said gating means for obtaining a second direct current signal proportional to the ratio of said last named signal outputs, second said multiplier means responsive to said second direct current signal and an alternating current signal from said second said modulation means for providing a product signal, and means responsive to said product signal for controlling said variable delay means.

No references cited.